United States Patent [19]

Crane et al.

[11] Patent Number: 5,349,738
[45] Date of Patent: Sep. 27, 1994

[54] ATTACHMENT METHODOLOGY FOR COMPOSITE CYLINDER ASSEMBLY

[75] Inventors: Roger M. Crane, Arnold; Paul Coffin, Chesapeake Beach, both of Md.

[73] Assignee: The United States of America as represented by the Secretary of the Navy, Washington, D.C.

[21] Appl. No.: 128,786

[22] Filed: Sep. 30, 1993

Related U.S. Application Data

[62] Division of Ser. No. 864,794, Apr. 7, 1992, Pat. No. 5,288,114.

[51] Int. Cl.$^5$ .................... F16L 21/00; F16L 25/00
[52] U.S. Cl. ..................... 29/434; 29/515; 285/370; 285/382.2; 285/913
[58] Field of Search ............... 29/434, 437, 408, 410, 29/898.054, 243.5, 243.517, 243.53, 515, 516; 285/370, 382.2, 397, 913

[56] References Cited

U.S. PATENT DOCUMENTS

| | | | |
|---|---|---|---|
| 4,550,937 | 11/1985 | Duret | 29/434 |
| 4,722,619 | 2/1988 | Reiser et al. | 29/515 X |
| 4,757,593 | 7/1988 | Pallini, Jr. et al. | 29/516 X |

*Primary Examiner*—Timothy V. Eley
*Assistant Examiner*—Khan V. Nguyen
*Attorney, Agent, or Firm*—Howard Kaiser

[57] ABSTRACT

Cylinder-to-cylinder attachment method and construction featuring nonutilization of mechanical fasteners or bonding, especially advantageous for attachment of cylinders which are composite or to be subjected to hydrostatic pressure. A fastening ring is interpositionally and rotatively engaged and aligned with a toothed axial end of each cylinder whereby the inwardly radial teeth for each cylinder appropriately mesh with the outer grooved circumferential surface of the fastening ring. The resultant joint is easily detachable and less susceptible than conventional joints to damage, breakage, degradation, stress concentrations and fluid infiltration.

21 Claims, 3 Drawing Sheets

ATTACHMENT METHODOLOGY FOR COMPOSITE CYLINDER ASSEMBLY

The invention described herein may be manufactured and used by or for the Government of the United States of America for governmental purposes without the payment of any royalties thereon or therefor.

This application is a division of application No. 07/864,794, filed Apr. 7, 1992now U.S. Pat. No. 5,288,144.

BACKGROUND OF THE INVENTION

The present invention relates to methods and constructions for attaching cylinders to each other, more particularly to methods and constructions for attaching hollow cylinders at the ends of the cylinders wherein at least one cylinder is made of composite material.

Conventional approaches to attaching composite cylinders either to other composite cylinders or to metallic cylinders implement bonded/bolted-joint or bolted-joint attachment schemes. The most common conventional methodology for cylinder attachment utilizes a scarf joint.

A significant limitation of these conventional attachment schemes is that the joint is permanent. If disassembly is required, the material is necessarily destroyed. Additionally, the use of a fastener creates some problems for either the bonded/bolted-joint attachment scheme or the bolted-joint attachment scheme. The mechanical fastener typically requires machining of the composite, which removes part of the material. This creates a weak point in the material, a site for stress concentrations, and a site for water migration or penetration from outside to inside.

One described approach accomplishes attachment of a composite cylinder to an aluminum end frame through a double-tapered joint that is machined into the composite shell after cure. See Harruff, P., Tsuchiyama T., and Spicola, F. C., "Filament Wound Torpedo Hull Structures," *Fabricating Composites '86 Proceedings*, Society of Manufacturing Engineers, Sep. 8–11, 1986, Baltimore, Md., incorporated herein by reference, esp. page 3. Although in this case the joint was detachable, it was still of greater stiffness than the bulk material and hence vulnerable. The machining and adhesive were critical to the viability of the joint.

For the B-1B composite Rotary Launch Tube, The U.S. Air Force attached composite cylinders together by adhesively bonding the composite cylinder to an aluminum forging; this method utilized a scarf or single-tapered joint. The composite was mechanically fastened to the metal with Hi-Lok fasteners in addition to the adhesive. Although the joint was thus also mechanically attached, the composite material was drilled and hence still compromised. With the removal of material and cutting of the fibers, this site not only manifested potential for reduced mechanical properties but for vulnerability to damage initiation and propagation.

OBJECTS OF THE INVENTION

In view of the foregoing, it is an object of the present invention to provide a method for composite-cylinder-to-composite-cylinder attachment or composite-cylinder-to-metal-cylinder attachment which creates a mechanically sounder and stronger joint which is less susceptible to damage or breakage at the site of the joint.

It is a further object of the present invention to provide such a method for attachment which creates an easily and nondestructively detachable joint.

Another object of this invention is to provide such a method for attachment which creates a joint which is less susceptible to stress concentrations at the site of the joint.

A further object of this invention is to provide such a method for attachment which creates a joint which is less susceptible to fluid infiltration at the site of the joint.

Other objects of this invention will become apparent from the following detailed description of the invention when considered in conjunction with the accompanying drawings.

SUMMARY OF THE INVENTION

The present invention provides cylinder-to-cylinder attachment method and construction which feature nonutilization of either mechanical fasteners or bonding. This invention is perhaps most markedly advantageous for embodiments wherein at least one of the cylinders is composite and hence the aforediscussed drawbacks of conventional attachment methods are most manifest and appreciably avoided by practice of this invention; however, it is emphasized that this invention is applicable, as appropriate, to attachment assemblies of cylinders having any and all material compositions, and in any and all combinations, e.g., metal-cylinder-to-metal-cylinder attachment.

The present invention provides a method for attaching hollow cylinders at the axial ends of the cylinders, comprising: engaging a fastening ring with a first flanged axial end of a first cylinder whereby a plurality of first teeth mesh with the fastening ring at the locations of intersection of a first circumferential channel with a plurality of axial channels; engaging the fastening ring with a second flanged axial end of a second cylinder whereby a plurality of second teeth mesh with the fastening ring at the locations of intersection of a second circumferential channel with a plurality of axial channels; and, rotating the fastening ring so as to align the first teeth and the second teeth with the axial rows, the first teeth meshing with the recessed faces of the axial rows and interposed between the raised faces of the first lateral circumferential row and the raised faces of the intermediate circumferential row, the second teeth meshing with the recessed faces of the axial rows and interposed between the raised faces of the second lateral circumferential row and the raised faces of the intermediate circumferential row.

The first flanged axial end has a first radially inwardly planar flange which is normal to the axis of the first cylinder. The first radially inwardly planar flange has the plurality of first teeth selectively distributed around the inner perimeter of the first radially inwardly planar flange.

The second flanged axial end has a second radially inwardly planar flange which is normal to the axis of the second cylinder. The second radially inwardly planar flange has the plurality of second teeth selectively distributed, correspondingly with the first teeth, around the inner perimeter of the second radially inwardly planar flange.

The outer circumferential surface of the fastening ring has the first circumferential channel, the second circumferential channel and the plurality of axial channels. The axial channels perpendicularly intersect the first circumferential channel and the second circumferential channel. The first circumferential channel, the second circumferential channel and the axial channels form three parallel circumferential rows of alternating raised and recessed faces and a plurality of parallel axial rows of alternating raised and recessed faces.

The three circumferential rows are a first lateral circumferential row, a second lateral circumferential row and an intermediate circumferential row. The first circumferential channel is interposed between the first lateral circumferential row and the intermediate row. The second circumferential channel is interposed between the second lateral circumferential row and the intermediate row. The axial channels are selectively distributed correspondingly with the first teeth of the first radially inwardly planar flange and with the second teeth of the second radially inwardly planar flange.

Accordingly, the present invention also provides a hollow cylinder assembly of two axially attached hollow cylinders, comprising: a first cylinder having the first flanged axial end, the first flanged axial end having the plurality of first teeth; the second cylinder having the second flanged axial end, the second flanged axial end having the plurality of second teeth which are distributed correspondingly with the first teeth; and, the fastening ring, the outer circumferential surface of the fastening ring having the two parallel circumferential channels and the plurality of parallel axial channels perpendicularly intersecting the circumferential channels, the circumferential channels and the axial channels forming the three parallel circumferential rows of uniformly raised and recessed faces and the plurality of parallel axial rows of uniformly raised and recessed faces. The fastening ring is rotatively aligned and engaged with the first flanged axial end and the second flanged axial end, the first teeth meshing with the fastening ring at the locations of intersection of the first circumferential channel with the axial rows, the second teeth meshing with the fastening ring at the locations of intersection of the second circumferential channel with the axial rows.

Many embodiments of the present invention utilize at least one tooth ring for toothed engagement with the fastening ring, rather than utilizing the radially inwardly planar flange of the flanged axial end of the cylinder for toothed engagement with the fastening ring. For some of these embodiments both the first cylinder and second cylinder utilize tooth rings, viz., a first tooth ring having a plurality of first teeth and a second tooth ring having a plurality of second teeth, respectively. For such embodiments of this invention a method is provided by this invention for attaching hollow cylinders at the axial ends of the cylinders, comprising: engaging a fastening ring with the first tooth ring of the first cylinder whereby the plurality of first teeth mesh with the fastening ring at the locations of intersection of the first circumferential channel with the plurality of axial channels; engaging the fastening ring with the second tooth ring of the second cylinder whereby the plurality of second teeth mesh with the fastening ring at the locations of intersection of the second circumferential channel with the plurality of axial channels; and, rotating the fastening ring so as to align the first teeth and the second teeth with the axial rows, the first teeth meshing with the recessed faces of the axial rows and interposed between the raised faces of the first lateral circumferential row and the raised faces of the intermediate circumferential row, the second teeth meshing with the recessed faces of the axial rows and interposed between the raised faces of the second lateral circumferential row and the raised faces of the intermediate circumferential row.

The first tooth ring is mated within the first flanged axial end of the first cylinder; the second tooth ring is mated within the second flanged axial end of the second cylinder. The first tooth ring has a first circumferentially contoured portion and a first radially inwardly planar portion, the first radially inwardly planar portion having the first teeth selectively distributed around the perimeter of the first radially inwardly planar portion. The second tooth ring has a second circumferentially contoured portion and a second radially inwardly planar portion, the second radially inwardly planar portion having the second teeth selectively distributed, correspondingly with the first teeth, around the perimeter of the second radially inwardly planar portion.

Accordingly, the present invention also provides a hollow cylinder assembly of two axially attached hollow cylinders, comprising: a first cylinder having the first flanged axial end; the first tooth ring having the plurality of first teeth; the second cylinder having the second flanged axial end; the second tooth ring having the plurality of second teeth which are distributed correspondingly with the first teeth; and, the fastening ring, the outer circumferential surface of the fastening ring having the two parallel circumferential channels and the plurality of parallel axial channels perpendicularly intersecting the circumferential channels, the circumferential channels and the axial channels forming the three parallel circumferential rows of uniformly raised and recessed faces and the plurality of parallel axial rows of uniformly raised and recessed faces. The fastening ring is rotatively aligned and engaged with the first tooth ring and the second tooth ring, the first teeth meshing with the fastening ring at the locations of intersection of the first circumferential channel with the axial rows, the second teeth meshing with the fastening ring at the locations of intersection of the second circumferential channel with the axial rows.

The cylinder attachment methodology which is provided in accordance with the present invention features solid and dependable cylinder attachment without degradation to either cylinder material, such as ensues when holes are drilled through cylinder material. The fastening ring, for most embodiments a metallic interface, helps to minimize stress concentrations. The attachment joint provided by this invention is easily and harmlessly disassembled and is capable of supporting both tensile and compressive loading without stress concentration fatigue degradation. The attachment arrangement provided by this invention is especially advantageous for composite cylinders which are subjected to hydrostatic pressure and concomitant possible fluid infiltration; hence, the methodology in accordance with this invention has particularly beneficial application for, inter alia, assembly of manned and unmanned submersibles and aircraft fuselage sections and attachment of pipe and shaft sections.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
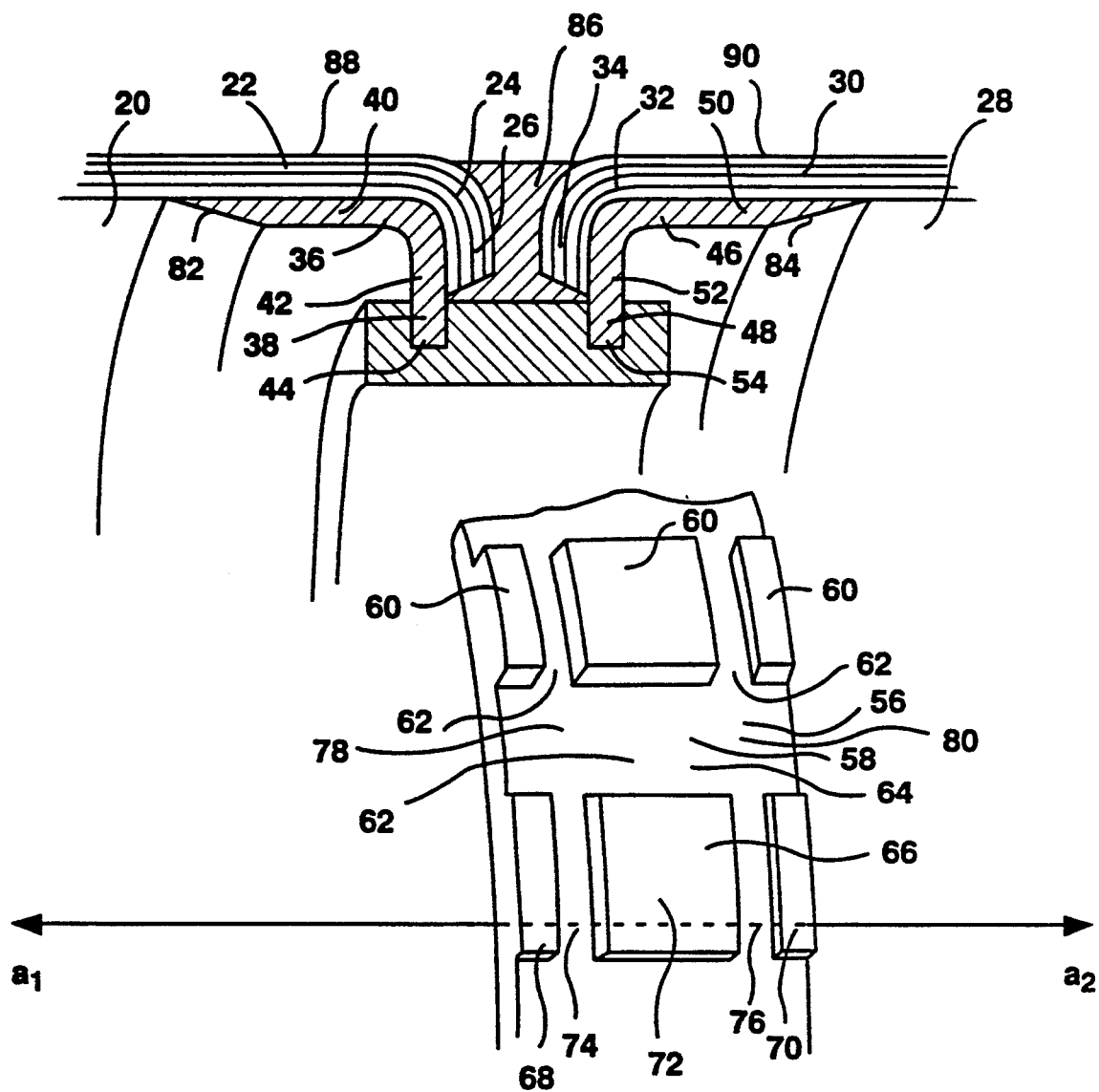
FIG. 1 is a diagrammatic partial perspective view, partially in section, of a cylinder attachment configuration in accordance with the present invention.

Referring now to FIG. 1, first cylinder 20 has shown first axial end section 22 and second cylinder 28 has shown second axial end section 30. First flanged axial end 24 of first cylinder 20 has first radially inwardly planar flange 26 which is normal to cylindrical axial direction $a_1$ of first cylinder 20. Second flanged axial end 32 of second cylinder 28 has second radially inwardly planar flange 34 which is normal to cylindrical axial direction $a_2$ of second cylinder 28.

First tooth ring 36 has first outer circumferentially contoured portion 40 and first radially inwardly planar portion 42. Second tooth ring 46 has second outer circumferentially contoured portion 50 and second radially inwardly planar portion 52. In this example first outer circumferentially contoured portion 40 of first tooth ring 36 has first taper 82 in axial direction $a_1$ away from fastening ring 56, in furtherance of reduction of stress concentrations under load; similarly, second outer circumferentially contoured portion 50 of second tooth ring 46 has second taper 84 in axial direction $a_2$ away from fastening ring 56.

Figure 2:
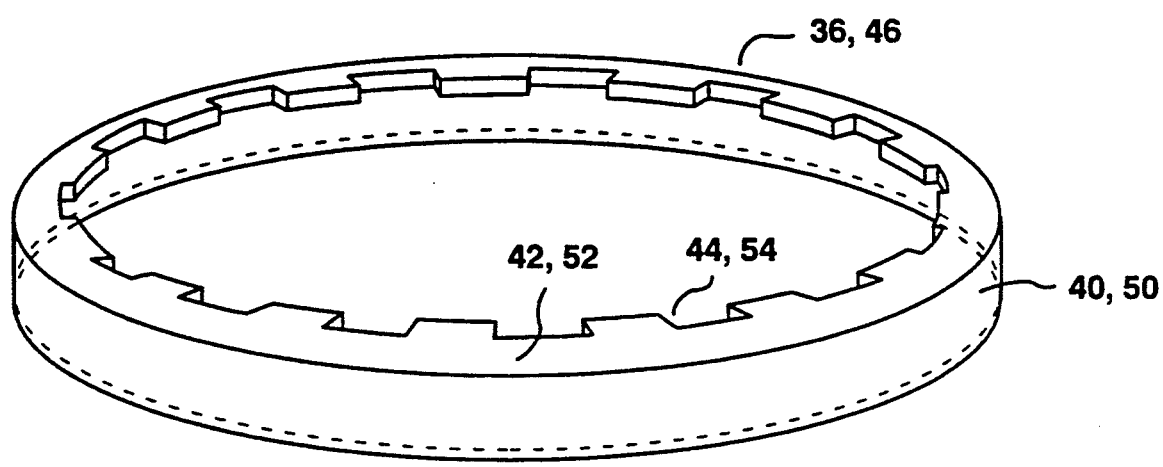
FIG. 2 is a diagrammatic perspective view of a tooth ring according to this invention.
Figure 3:
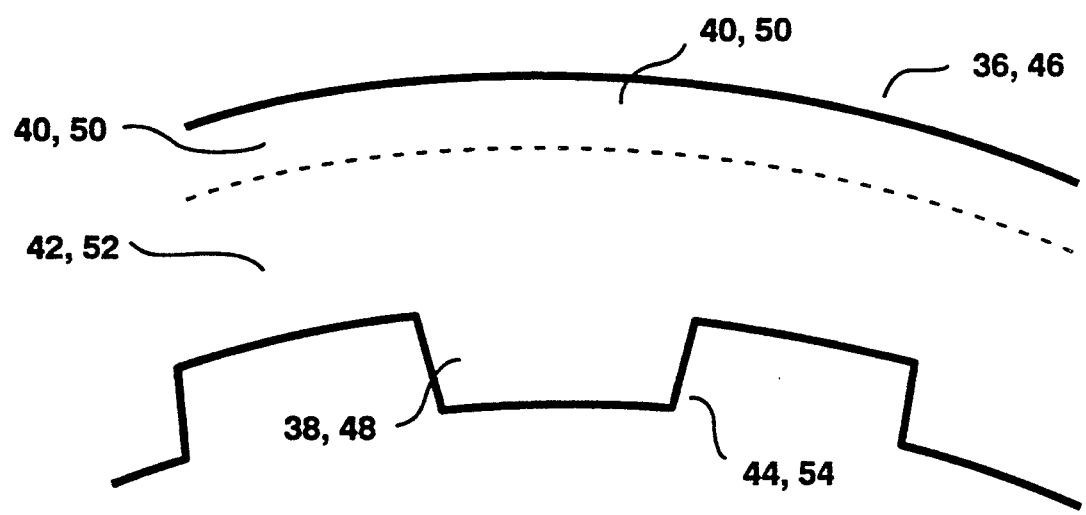
FIG. 3 is a diagrammatic enlarged partial plan view of the tooth ring in FIG. 2.

With reference to FIG. 2 and FIG. 3, which show a tooth ring configuration in accordance with this invention which is generally illustrative of either first tooth ring 36 or second tooth ring 46 in this example, first tooth ring 36 has a plurality of first teeth 38 uniformly distributed around first inner toothed perimeter 44 of first inwardly radially planar portion 42 of first tooth ring 36. Second tooth ring 46 has a plurality of second teeth 48 uniformly distributed, correspondingly with first teeth 38, around second inner toothed perimeter 54 of second inwardly radially planar portion 52 of second tooth ring 46. First teeth 38 and second teeth 48 are selectively distributed about inner toothed perimeter 44 and second inner toothed perimeter 54, respectively, in accordance with this invention; in this example distribution of teeth 38 and 48 is selected to be uniform.

Referring again to FIG. 1, first tooth ring 36 is flushly mated within first flanged axial end 24 of first cylinder 20. Second tooth ring 46 is flushly mated within second flanged axial end 32 of second cylinder 28. Techniques are well known in the art for securing mating of flanged axial ends 24 and 32 with tooth rings 36 and 46, respectively; most embodiments of this invention use adhesive at the mating surfaces of the tooth ring and the corresponding flanged axial end. For some embodiments, bolts are preferably used in addition to or instead of adhesive for mating a tooth ring within a flanged axial end.

Outer grooved circumferential surface 58 of fastening ring 56 has a plurality of evenly raised faces 60 and a plurality of evenly recessed faces 62. Recessed faces 62 define first circumferential channel 74, second circumferential channel 76 and a plurality of parallel axial channels 64. Raised faces 60 define first lateral circumferential row 68, second lateral circumferential row 70, intermediate circumferential row 72 and a plurality of parallel axial rows 66. First circumferential channel 74 is interposed between first lateral circumferential row 68 and intermediate circumferential row 72; second circumferential channel 76 is interposed between second lateral circumferential row 70 and intermediate circumferential row 72. Axial channels 64 perpendicularly intersect first circumferential channel 74 and second circumferential channel 76. Axial channels 64 are selectively distributed correspondingly with first teeth 38 of first tooth ring 36 and with second teeth 48 of second tooth ring 46, in this example uniformly distributed. The three parallel circumferential rows 68, 70 and 72 and the plurality of parallel axial rows 66 each have raised faces 60 alternating with recessed faces 62. The two parallel circumferential channels 74 and 76 and the plurality of parallel axial channels 64 each have recessed faces 62 defining a continuous recessed surface.

The tooth ring in accordance with this invention can be made of any appropriate material, e.g., metal or composite; however, for most embodiments of this invention the tooth ring is preferably metal because the loads may be expected to be more uniformly distributed when isotropic materials are used. The fastening ring in accordance with this invention is preferably made of metal, with a predetermined or selected stiffness.

Fastening ring 56 is engaged with first tooth ring 36 whereby first teeth 38 mesh with fastening ring 56 at first channel intersection locations 78, the locations of intersection of first circumferential channel 74 with axial channels 64. Similarly, fastening ring 56 is engaged with second tooth ring 46 whereby second teeth 48 mesh with fastening ring 56 at second channel intersection locations 80, the locations of intersection of second circumferential channel 76 with axial channels 64. Cylindrical axial directions $a_1$ and $a_2$ are equivalent.

Fastening ring 56 is rotated so as to align first teeth 38 and second teeth 48 with axial rows 66. First teeth 38 mesh with recessed faces 62 of axial rows 66 and are interposed between raised faces 60 of first lateral circumferential row 68 and raised faces 60 of intermediate circumferential row 72. Second teeth 48 mesh with recessed faces 62 of axial rows 66 and are interposed between raised faces 60 of second lateral circumferential row 70 and raised faces 60 of intermediate circumferential row 72.

The assembly is detachable by first rotating fastening ring 56 so as to align first teeth 38 and second teeth 48 with axial channels 64. In this alignment, first teeth 38 oppose recessed faces 62 at first channel intersection location 78 similarly, second teeth 48 oppose recessed faces 62 at second channel intersection locations 80 First cylinder 20 and second cylinder 28 are then each axially separated from fastening ring 56.

In this example compression ring 86 is set radially outwardly adjacent to fastening ring 56 and between first flanged axial end 24 and second flanged axial end 32. Compression ring 86 is substantially flush with first outer circumferential cylindrical surface 88 of first cylinder 20 and second outer circumferential cylindrical surface 90 of second cylinder 28. Compression ring 86 transfers the axial compressive loads between cylinders 20 and 28, and can be made of any appropriate material, including metal, so long as its modulus is considered during design. In some embodiments of this invention compression ring 86 is a sealing ring of any appropriate type of viscoelastic or deformable material which can be compressed and act as a seal.

Figure 4:
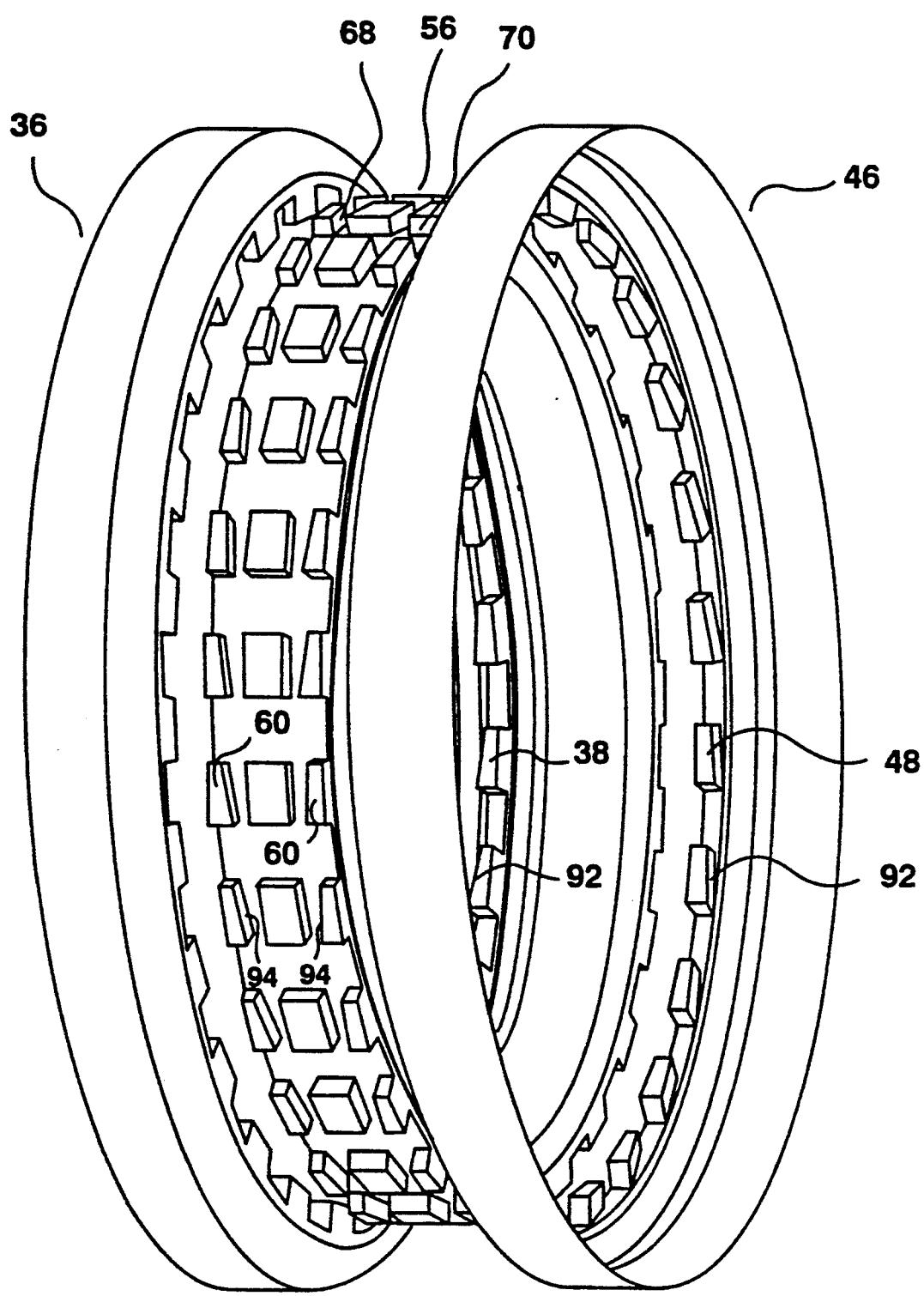
FIG. 4 is a diagrammatic perspective view of two tooth rings and an interposed fastening ring having teeth and raised faces, respectively, with slanted side surfaces.

For many embodiments of this invention, some teeth and lateral raised faces preferably have side surfaces which are complementarily slanted in furtherance of sound engagement of the tooth rings with the fastening ring. Referring to FIG. 4, first teeth 38 and second teeth 48 have lateral side surface slants 92. Raised faces 60 of first lateral circumferential row 68 and raised faces 60 of second lateral circumferential row 70 have medial side surface slants 94. For most such embodiments the inclinations of slants 92 and 94 depend upon the dimensions and relative stiffnesses of cylinders 20 and 28, tooth rings 36 and 46, fastening ring 56, and compression ring 86.

Two especially noteworthy contradistinctions may be drawn among various embodiments of the present invention. In this example both a first tooth ring 36 and a second tooth ring 46 are utilized for toothed engagement with fastening ring 56. One contradistinction is that between those embodiments which utilize either or both of tooth ring 36 and 46 for toothed engagement with fastening ring 56, and those embodiments which do not utilize a tooth ring 36 or 46, i.e., those which utilize both inwardly radially planar flanges 26 and 34 of both flanged axial ends 24 and 32 of both cylinders 20 and 28 for toothed engagement with fastening ring 56. The latter category most particularly includes embodiments of the present invention wherein tooth ring 36 or 46 is preferably used as being is of a stronger material composition than cylinder 20 or 28, as for example wherein cylinder 20 or 28 is composite and tooth ring 36 or 46 is metallic, tooth ring 36 or 46 thus serving to provide a stronger joint than that which would be provided by toothed inwardly radially planar flange 26 or 34 alone in accordance with this invention. Some embodiments of this invention utilize toothed inwardly radially planar flange 26 or 34 and complementarily toothed tooth ring 36 or 46 which are mutually fortifying and together provide teeth 38 or 48.

A second contradistinction is that between those embodiments which utilize axial end sections 22 and 30 which are both prefabricatedly ready for toothed engagement with fastening ring 56 in accordance with this invention, and those embodiments which entail adaptation of either or both of axial end sections 22 and 30 for readiness for toothed engagement with fastening ring 56 in accordance with this invention. For prefabricative embodiments axial end section 22 or 30 is specially manufactured with a view toward toothed engagement with fastening ring 56. Some of these prefabricative embodiments integrally manufacture tooth ring 36 or 46 with axial end section 22 or 30; for many such embodiments cylinder 20 or 28 is composite and tooth ring 36 or 46 is metallic.

For adaptive embodiments adaptation of axial end section 22 or 30 is accomplished, for embodiments involving at least one engagement-ready toothed axial end without use of a tooth ring 36 or 46, by radially inwardly bending and toothing axial end section 22 or 30 so as to form flanged axial end 24 or 32 having inwardly radially planar flange 26 or 34 which is appropriately toothed for engagement with fastening ring 56 in accordance with this invention. For embodiments of this invention which utilize at least one tooth ring 36 or 46 for toothed engagement with fastening ring 56, axial end section 22 or 30 is radially inwardly bent so as to form flanged axial end 24 or 32 having inwardly radially planar flange 26 or 34, and tooth ring 36 or 46 is mated with flanged axial end 24 or 32. For some of these embodiments tooth ring 36 or 46 is segmented to permit or facilitate mating with flanged axial end 24 or 32. For some embodiments axial end section 22 or 30 has a scarfed outer cylindrical circumferential surface 88 or 90 which permits attachment of a complementary cylindrical piece which has the appropriate inwardly radially planar flange 26 or 34 for mating with tooth ring 36 or 46. For some embodiments tooth ring 36 or 46 is not appropriately configured and/or is untoothed and needs to be appropriately configured and/or toothed prior to engagement with fastening ring 56. Techniques are known in the art for manufacturing cylinders with appropriately configured and toothed end sections, as well as for appropriately adapting cylinders which were not manufactured with the appropriate characteristics, in accordance with this invention.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A method for attaching first and second hollow cylinders, each having an axial end and a longitudinal axis, comprising:

engaging a fastening ring with a first flanged axial end of a first cylinder whereby a plurality of first teeth mesh with said fastening ring at the locations of intersection of a first circumferential channel with a plurality of axial channels;

engaging said fastening ring with a second flanged axial end of a second cylinder whereby a plurality of second teeth oppose said fastening ring at the locations of intersection of a second circumferential channel with a plurality of axial channels;

said first flanged axial end having a first radially inwardly planar flange which is normal to the axis of said first cylinder;

said first radially inwardly planar flange having said plurality of first teeth selectively distributed around the inner perimeter of said first radially inwardly planar flange;

said second flanged axial end having a second radially inwardly planar flange which is nodal to the axis of said second cylinder;

said second radially inwardly planar flange having said plurality of second teeth selectively distributed, correspondingly with said first teeth, around the inner perimeter of said second radially inwardly planar flange;

said fastening ring includes an outer circumferential surface having said first circumferential channel, said second circumferential channel and said plurality of axial channels;

said axial channels perpendicularly intersecting said first circumferential channel and said second circumferential channel;

said first circumferential channel, said second circumferential channel and said axial channels forming three parallel circumferential rows of alternating raised and recessed faces and a plurality of parallel axial rows of alternating raised and recessed faces;

said three circumferential rows being a first lateral circumferential row, a second lateral circumferential row and an intermediate circumferential row;

said first circumferential channel being interposed between said first lateral circumferential row and said intermediate row;

said second circumferential channel being interposed between said second lateral circumferential row and said intermediate row;

said axial channels being selectively distributed correspondingly with said first teeth of said first radially inwardly planar flange and with said second teeth of said second radially inwardly planar flange; and rotating said fastening ring so as to align said first teeth and said second teeth with said axial rows, said first teeth meshing with said recessed faces of said axial rows and interposed between said raised faces of said first lateral circumferential row and said raised faces of said intermediate circumferential row, said second teeth meshing with said recessed faces of said axial rows and interposed between said raised faces of said second lateral circumferential row and said raised faces of said intermediate circumferential row.

2. A method for attaching hollow cylinders as in claim 1, further comprising forming said first flanged axial end of said first cylinder, said forming including radially inwardly bending and toothing a first axial end of said first cylinder.

3. A method for attaching hollow cylinders as in claim 1, further comprising forming said second flanged axial end of said second cylinder, said forming including radially inwardly bending and toothing a second axial end of said second cylinder.

4. A method for attaching hollow cylinders as in claim 1, further comprising forming said first flanged axial end of said first cylinder and forming said second flanged axial end of said second cylinder, said forming including radially inwardly bending and toothing a first axial end of said first cylinder, and radially inwardly bending and toothing a second axial end of said second cylinder.

5. A method for attaching hollow cylinders as in claim 1, further comprising setting a sealing ring radially outwardly adjacent to said fastening ring and between said first flanged axial end and said second flanged axial end, said sealing ring being substantially flush with the outer circumferential surface of said first cylinder and the outer circumferential surface of said second cylinder.

6. A method for attaching hollow cylinders as in claim 1, wherein at least one said first tooth and at least one said raised face of said first lateral circumferential row have complementarily slanted side surfaces.

7. A method for attaching hollow cylinders as in claim 1, wherein at least one said second tooth and at least one said raised face of said second lateral circumferential row have complementarily slanted side surfaces.

8. A method for attaching first and second hollow cylinders, each having an axial end and a longitudinal axis, comprising:

engaging a fastening ring with a first tooth ring of a first cylinder whereby a plurality of first teeth mesh with said fastening ring at the locations of intersection of a first circumferential channel with a plurality of axial channels;

engaging said fastening ring with a second tooth ring of a second cylinder whereby a plurality of second teeth oppose said fastening ring at the locations of intersection of a second circumferential channel with a plurality of axial channels;

said first tooth ring being mated within a first flanged axial end of said first cylinder, said first tooth ring having said plurality of first teeth, said first tooth ring having a first circumferentially planar portion and a first radially inwardly planar portion;

said first radially inwardly planar portion having said first teeth selectively distributed around the perimeter of said first radially inwardly planar portion;

said second tooth ring being mated within a second flanged axial end of said second cylinder, said second tooth ring having said plurality of second teeth, said second tooth ring having a second circumferentially planar portion and a second radially inwardly planar portion;

said second radially inwardly planar portion having said second teeth selectively distributed, correspondingly with said first teeth, around the perimeter of said second radially inwardly planar portion;

said first flanged axial end having a first radially inwardly planar flange which is normal to the axis of said first cylinder;

said second flanged axial end having a second radially inwardly planar flange which is normal to the axis of said second cylinder;

said fastening ring includes an outer circumferential surface having said first circumferential channel, said second circumferential channel and said plurality of axial channels;

said axial channels perpendicularly intersecting said first circumferential channel and said second circumferential channel;

said first circumferential channel, said second circumferential channel and said axial channels forming three parallel circumferential rows of alternating raised and recessed faces and a plurality of parallel axial rows of alternating raised and recessed faces;

said three circumferential rows being a first lateral circumferential row, a second lateral circumferential row and an intermediate circumferential row;

said first circumferential channel being interposed between said first lateral circumferential row and said intermediate row;

said second circumferential channel being interposed between said second lateral circumferential row and said intermediate row;

said axial channels being selectively distributed correspondingly with said first teeth of said first tooth ring and with said second teeth of said second tooth ring; and rotating said fastening ring so as to align said first teeth and said second teeth with said axial rows, said first teeth meshing with said recessed faces of said axial rows and interposed between said raised faces of said first lateral circumferential row and said raised faces of said intermediate circumferential row, said second teeth meshing with said recessed faces of said axial rows and interposed between said raised faces of said second lateral circumferential row and said raised faces of said intermediate circumferential row.

9. A method for attaching hollow cylinders as in claim 8, further comprising, prior to said engaging of said fastening ring with said first tooth ring, radially inwardly bending said first axial end of said first cylinder to form said first flanged axial end, and mating said first tooth ring within said first flanged axial end.

10. A method for attaching hollow cylinders as in claim 9, further comprising toothing said first tooth ring.

11. A method for attaching hollow cylinders as in claim 8, further comprising, prior to said engaging of said fastening ring with said second tooth ring, radially inwardly bending said second axial end of said second cylinder to form said second flanged axial end, and mating said second tooth ring within said second flanged axial end.

12. A method for attaching hollow cylinders as in claim 11, further comprising toothing said second tooth ring.

13. A method for attaching hollow cylinders as in claim 8, further comprising, prior to said engaging of said fastening ring with said first tooth ring and with said second tooth ring, radially inwardly bending said first axial end of said first cylinder to form said first flanged axial end, mating said first tooth ring within said first flanged axial end, radially inwardly bending said second axial end of said second cylinder to form said second flanged axial end, and mating said second tooth ring within said second flanged axial end.

14. A method for attaching hollow cylinders as in claim 13, further comprising toothing said first tooth ring and said second tooth ring.

15. A method for attaching hollow cylinders as in claim 8, further comprising setting a sealing ring radially outwardly adjacent to said fastening ring and between said first flanged axial end and said second flanged axial end, said sealing ring being substantially flush with the outer circumferential surface of said first cylinder and the outer circumferential surface of said second cylinder.

16. A method for attaching hollow cylinders as in claim 8, wherein said first circumferentially planar portion of said first tooth ring is tapered in the axial direction opposite said fastening ring.

17. A method for attaching hollow cylinders as in claim 8, wherein said second circumferentially planar portion of said second tooth ring is tapered in the axial direction opposite said fastening ring.

18. A method for attaching hollow cylinders as in claim 8, wherein said first teeth are uniformly distributed around said perimeter of said first radially inwardly planar portion.

19. A method for attaching hollow cylinders as in claim 8, wherein said second teeth are uniformly distributed around said perimeter of said second radially inwardly planar portion.

20. A method for attaching hollow cylinders as in claim 8, wherein at least one said first tooth and at least one said raised face of said first lateral circumferential row have complementarily slanted side surfaces.

21. A method for attaching hollow cylinders as in claim 8, wherein at least one said second tooth and at least one said raised face of said second lateral circumferential row have complementarily slanted side surfaces.

* * * * *